United States Patent [19]

Sherif et al.

[11] 4,184,980
[45] Jan. 22, 1980

[54] SULFURIC ACID CATALYST AND PROCESS THEREFOR

[75] Inventors: Fawzy G. Sherif, Stony Point, N.Y.; W. Novis Smith, Quakertown, Pa.

[73] Assignee: Stauffer Chemical Company, Westport, Conn.

[21] Appl. No.: 862,807

[22] Filed: Dec. 21, 1977

[51] Int. Cl.$^2$ .................... B01J 27/02; B01J 27/02; C01B 17/68
[52] U.S. Cl. .................... 252/436; 252/439; 252/440; 423/535
[58] Field of Search .................... 252/436, 440, 439; 423/535

[56] References Cited

U.S. PATENT DOCUMENTS

| Re. 18,380 | 3/1932 | Jaeger | 423/535 |
|---|---|---|---|
| Re. 19,282 | 8/1934 | Slama et al. | 23/175 |
| 1,696,546 | 12/1928 | Jaeger et al. | 423/535 |
| 1,862,825 | 6/1932 | Laury | 423/535 |
| 2,029,376 | 2/1936 | Joseph | 423/535 |
| 2,381,908 | 8/1945 | Hurt | 252/228.4 |
| 3,216,953 | 11/1965 | Krempff | 252/456 |
| 3,275,406 | 9/1966 | Krempff | 23/175 |
| 3,448,061 | 6/1969 | Mika | 252/456 |

*Primary Examiner*—Delbert E. Gantz
*Assistant Examiner*—William G. Wright
*Attorney, Agent, or Firm*—H. Z. Friedlander

[57] ABSTRACT

A sulfuric acid catalyst is made by passing sulfur dioxide gas into an aqueous mixture of vanadium oxide, sulfuric acid, and a potassium salt compatible with the reducing reaction in situ, until a clear blue solution is obtained, wetting diatomaceous earth with this solution, drying and then calcining to provide an active supported catalyst. The process eliminates the necessity for activating the catalyst prior to use by exposure to a gas-stream containing sulfur dioxide and sulfur trioxide.

6 Claims, 1 Drawing Figure

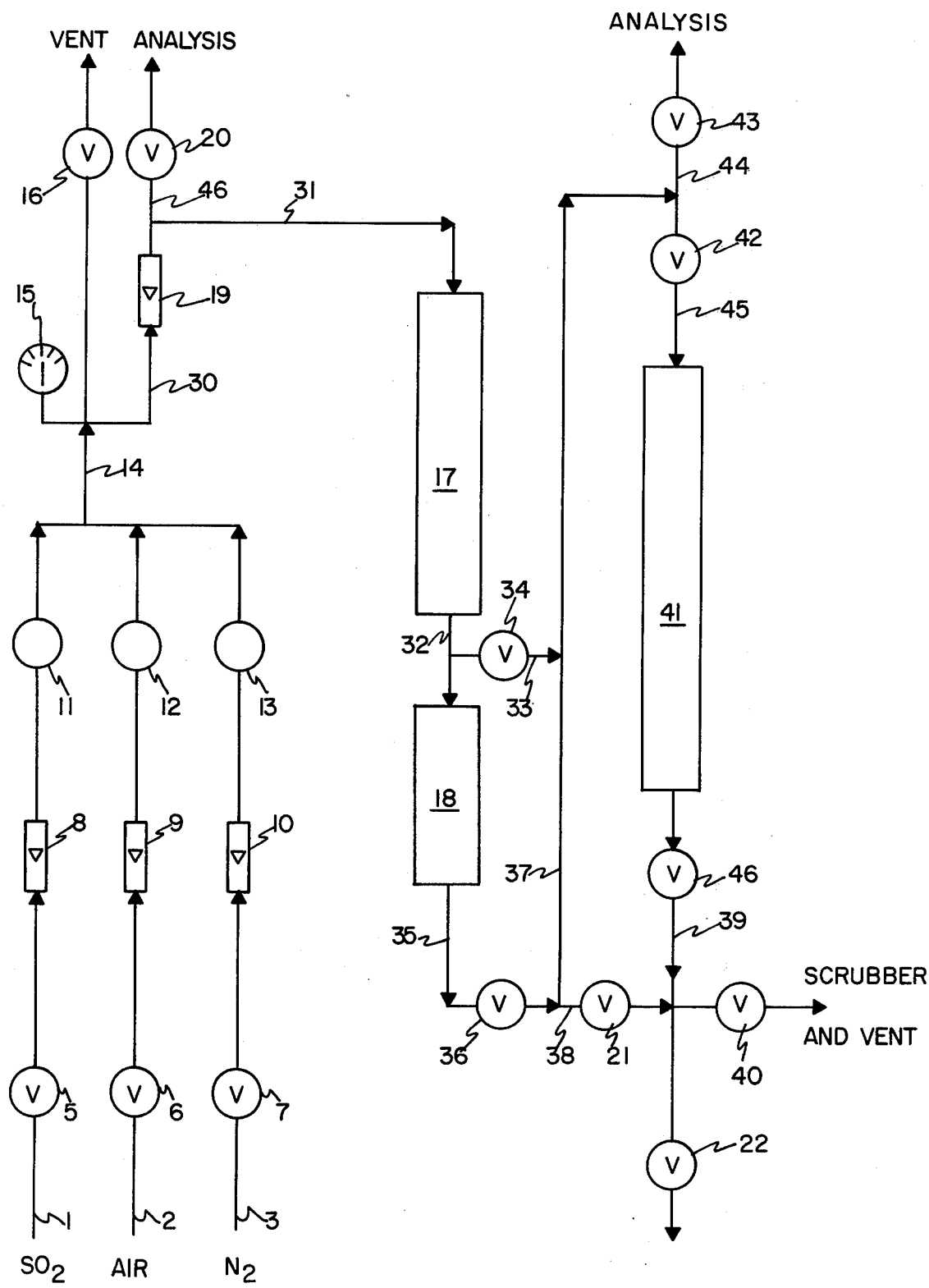

SULFURIC ACID CATALYST AND PROCESS THEREFOR

BACKGROUND OF THE INVENTION

This invention relates to a catalyst for the oxidation of sulfur dioxide to sulfur trioxide.

Sulfuric acid is generally prepared on a commercial scale by the gas phase oxidation of sulfur dioxide to sulfur trioxide followed by absorption of the sulfur trioxide in an aqueous medium. The oxidation of sulfur dioxide to sulfur trioxide is generally carried out over an absorptive carrier containing vanadium.

Various processes for preparing supported sulfuric acid catalysts have been described in the prior art.

Thus, U.S. Pat. No. Re. 19,282 discloses the addition of potassium or sodium hydrate, carbonate, sulfate or nitrate together with a vanadium compound to a very finely divided carrier. After the catalyst is molded or pressed into the desired shape, it is treated with gases containing sulfur dioxide, such as burner gases.

U.S. Pat. No. 1,862,825 describes spraying a natural diatomaceous earth aggregrate with a solution of sodium vanadate, drying and heating, preferably in an atmosphere of sulfur dioxide. However, sodium vanadate is generally not used in commercial operations since the potassium salt has been found to be more active.

In U.S. Pat. No. 3,216,953, a vanadium-potassium-silica catalyst is described. This catalyst is made by mixing aqueous potassium hydroxide with vanadium oxide and dilute sulfuric acid in such quantity as to maintain an alkaline solution, mixing the solution with ammonium hydroxide and adding the resulting mixture to silica particles. The ammonium hydroxide is required in order to solubilize the potassium and vanadium compounds, for example, potassium vanadate and potassium sulfate, which are formed in the alkaline reaction medium.

The use of vanadyl sulfate and potassium vanadyl sulfate in multi-step processes for preparing sulfuric acid catalysts has also been disclosed. For example, U.S. Pat. No. Re. 18,380 describes passing sulfur dioxide through an aqueous suspension of vanadium oxide in sulfuric acid to provide blue vanadyl sulfate. Part of this blue vanadyl sulfate solution is treated with potassium hydroxide to provide brown potassium vanadite. Then the brown potassium vanadite is mixed with diatomaceous earth and the remainder of the blue vanadyl sulfate solution added. The resulting support is then treated with gases containing sulfur dioxide gas prior to use as a catalyst. Thus, both vanadyl sulfate and potassium vanadite are required to provide the desired catalyst.

U.S. Pat. No. 1,696,546 describes base exchanging silicate catalysts containing both catalytic cations and anions. One example involved passing sulfur dioxide through an aqueous mixture of vanadium oxide and potassium hydroxide to provide a precipitate of potassium vanadyl sulfate which is then dissolved by means of potassium hydroxide. The resulting brown solution is used together with a solution of chrome alum in potassium hydroxide and a mixture of aqueous potassium silicate and a carrier to provide the desired catalyst.

Unsupported sulfuric acid catalysts, such as the mixture of a vanadium compound in a molten alkali metal sulfate disclosed in U.S. Pat. No. 2,381,908, have also been described in the literature. However, such systems have not found wide-spread commercial use.

The above described catalysts are all subject to certain drawbacks which make them unattractive for use in commercial applications. Thus, some of them require several solutions in treating the carrier, while others require a subsequent treatment of the catalysts with gases containing sulfur dioxide prior to use, in order to produce hard substances that withstand stress during transportation to users and during loading in commercial converters.

Now it has been found in accordance with this invention that a supported sulfuric acid catalyst can be made by wetting diatomaceous earth with a solution of potassium sulfate and vanadyl sulfate made by passing sulfur dioxide gas into an aqueous mixture of vanadium oxide, sulfuric acid and a potassium salt compatible with the reducing reaction in situ. The diatomaceous earth is then dried and calcined to provide a catalyst which is suitable for use directly in a sulfuric acid process without requiring additional sulfating, thus permitting catalyst production independent of the availability of gas streams from a converter. Furthermore, the use of only one solution to treat the diatomaceous earth presents an additional commercial advantage.

BRIEF DESCRIPTION OF THE DRAWINGS

The FIGURE is a diagrammatic drawing of the apparatus for determining catalyst activity.

DETAILED DESCRIPTION OF THE INVENTION

More in detail, the catalyst solution employed in this invention is prepared by passing excess sulfur dioxide gas into an aqueous mixture of vanadium oxide, sulfuric acid and a potassium salt compatible with the reducing reaction in situ, until a clear blue solution of the slurried solids is obtained, wetting diatomaceous earth with the solution, drying the wet diatomaceous earth and then calcining to provide a catalyst containing the final form of the active ingredients.

The components are present in concentrations which will provide a completely soluble blue solution. Thus, it has been found that the concentrations of the components in the final catalyst solution should be within the following ranges: 7.5–8.5% by weight $V_2O_5$, 20–25% by weight $K_2SO_4$, 40–50% by weight $H_2SO_4$ and 20–30% by weight $H_2O$. It should be noted that while the solution is believed to contain potassium sulfate and vanadyl sulfate, the concentrations are expressed as percentages by weight of the aforementioned components in accordance with the generally accepted procedure in this art.

The potassium salt can be any soluble salt which, in aqueous solution, will not interfere with the reduction of vanadium. Illustrative salts include potassium sulfate, potassium sulfite, potassium oxalate and potassium formate, with potassium sulfate being preferred.

The sulfur dioxide gas is passed through the mixture at a temperature between about 25° and about 120° C., and preferably between about 100° and about 120° C., for a period of about 0.5 to about 5 hours. The clear blue solution is believed to contain both potassium sulfate and vanadyl sulfate.

The blue solution is then mixed with the diatomaceous earth, preferably employing a volume of solution that will at least equal the pore volume of the support. If the volume of the solution equals the pore volume of the support, the optimum process conditions will be achieved.

Any diatomaceous earth can be employed as the support in the practice of this invention. Generally these earths have the following properties: high porosity; low alumina content, preferably less than 6% by weight; and stability to the acidic nature of the impregnating solution. The diatomaceous earth can be in particulate form, the support being shaped after impregnation, or it can be in the form of preshaped particles. In both variations, the particle size distribution must be such that the final catalyst support is rigid and possesses high abrasion resistance. Illustrative diatomaceous earths are found in *Diatomaceous Earth* by Robert Calvert, American Monograph Series, the Chemical Catalog Company, Inc., New York, N.Y. 1930.

The blue solution is preferably added while heating to a temperature between about 80° and about 130° C. Where the particulate form of diatomaceous earth is used, after it has absorbed the blue solution, additional water may be added, if necessary, to provide a consistency suitable for agglomerating the particles. The particles can be conveniently agglomerated by tableting, pelletizing, etc. Where a pre-shaped support is used, the impregnated support is ready for the next steps where drying and calcination are carried out.

The impregnated support is first dried to remove any excess moisture, and then calcined at a temperature from about 200° to about 600° C., and preferably from about 350° to about 500° C. During drying and/or calcination, it is believed that the mixture of potassium sulfate and vanadyl sulfate is converted to a mixture of potassium sulfovanadate and potassium pyrosulfovanadate. The vanadium content in the final support is about 5 to about 9 percent by weight, calculated as $V_2O_5$.

As previously mentioned, it is a feature of this invention that the shaped and dried catalyst is ready for use directly in a sulfuric acid process without requiring activation by exposure to an $SO_2$–$SO_3$ gas stream. This presents a decided commercial advantage in that sulfating processes require the sulfating gas-stream from a converter. Thus, if such a stream is unavailable, it could result in a shut-down of a catalyst plant. Furthermore, the heat necessary for the sulfating process is costly and the time required to sulfate is generally about 30 percent of the total time of the catalyst manufacture.

While it is not desired to be bound by theory, it is believed that the catalyst of this invention is already sulfated by obtaining a $SO_3$ molecule necessary for forming the potassium sulfovanadate and potassium pyrosulfovanadate in situ from the sulfuric acid.

The catalyst provided according to the process of this invention has excellent properties making it suitable for use in commercial operations.

The activity of the catalysts shown in the example and comparative example was determined by measuring the conversions obtained by passing a gas stream containing sulfur dioxide, sulfur trioxide, oxygen and nitrogen over the catalysts at a controlled rate and temperature.

The activity of the catalyst was determined by measuring the amount of sulfur dioxide converted to sulfur trioxide in a partially reacted sulfur dioxide containing gas stream. A gas stream containing sulfur dioxide, oxygen and nitrogen is first passed over a sulfur dioxide oxidation catalyst to convert from about 90 to about 97% of the sulfur dioxide to sulfur trioxide. The sulfur dioxide content of the partially converted gas stream is passed over the catalyst to be tested. The catalyst being tested is maintained at a controlled temperature and the flow rate of sulfur dioxide containing gas contacting the catalyst is carefully controlled. The sulfur dioxide content of the gas stream before and after contact with the catalyst being tested is measured. The activity for the particular catalyst is determined from the concentration of oxygen, sulfur dioxide and sulfur trioxide in the gas stream entering the test reactor and the concentration of oxygen, sulfur dioxide and sulfur trioxide in the gas stream leaving the test reactor at the temperature of testing. The apparatus for catalyst testing is shown in the Figure.

Cylinders of dry sulfur dioxide, air and nitrogen properly pressure-reduced are connected to lines 1, 2 and 3, respectively. The systems for metering the three gases are the same. The gases at a pressure of about 10 pounds per square inch gauge (psig) enter the system and pass through shut-off valves 5, 6 and 7 in the sulfur dioxide, air and nitrogen lines. The gases are metered at a pressure of about 10 psig through rotameters 8, 9 and 10 and flow control means 11, 12 and 13. The gases are mixed in line 14 at a pressure between 1 and 2 psig. The pressure in line 14 is monitored by pressure gauge 15. Vent valve 16 in line 14 permits the mixture of gases to be passed to the vent until the required mixture of gases is obtained. The total flow of mixed gases passing through line 30 is measured by rotameter 19. The mixed gas stream is passed through line 31 to reactor 17. A sample can be taken through line 46 and valve 20 to determine the concentration of sulfur dioxide in the gas stream.

Reactors 17 and 18 are electrically heated reactors and contain a sulfur dioxide oxidation catalyst. Reactors 17 and 18 are utilized to convert a portion of the sulfur dioxide in the gas stream to sulfur trioxide. One or two reactors are utilized depending upon the amount of preconversion desired for a particular run. The preconverted gas leaving reactor 17 passes through line 32 and can pass through line 33 and valve 34 to line 37 and directly to test reactor 41 through valve 42 and line 45. If additional preconversion is required the partially converted gas stream can be passed through reactor 18, line 35 and valve 36 to line 37 which passes the preconverted gas to test reactor 41.

A sample of the preconverted gas in line 37 is removed from the system through line 44 and valve 43 for analysis. The preconverted gas stream is passed through valve 42 and line 45 to test reactor 41.

Test reactor 41 is immersed in a heated fluidized sand bath which is controlled to maintain the proper temperature in the reactor. The test reactor 41 has a 1 inch inside diameter. Fifty cubic centimeters of catalyst is introduced into the reactor for testing. The effluent from the test reactor is passed through valve 46 in line 39 and passed through valve 40 to the scrubber and the vent. A sample for analysis can be taken from the system through valve 22.

Reactor 41 can be by-passed by passing the preconverted gas through line 38 and valve 21 to line 39.

During testing of a catalyst the sulfur dioxide concentration in the gas stream entering the test reactor through line 45 and leaving the reactor through line 39 are monitored. The gas mixture entering reactors 17 and 18 through line 31 is adjusted to contain about 9.5% $SO_2$, about 11.4% $O_2$ and the balance, nitrogen. The catalyst being tested is equilibrated by passing the preconverted gas stream over the catalyst at the test temperature for 2 hours before sampling the gas stream. The sulfur dioxide concentration in the preconverted gas stream and in the gas stream after contact with the catalyst being tested is determined by iodometric titration.

The amount of sulfur dioxide and oxygen in the gas stream entering and leaving the test reactor is measured. The rate constant k, was computed from the data using the following rate expression.

rate = $k(P_{SO_2}/P_{SO_3})^{0.5} \cdot P_{O_2} [1 - (P_{SO_3}/P_{O_2}^{0.5} P_{SO_2}keq)^{0.5}]$ where keq = equilibrium constant $$\log keq = \frac{5186.5}{T_A} + 0.611 \log T_A - 6.7497$$

$T_A$ = temperature, °K.
$P_{SO_2}$ = Partial pressure of $SO_2$ in atmospheres.
$P_{SO_3}$ = Partial pressure of $SO_3$ in atmospheres formed by contact with the catalyst being tested.
$P_{O_2}$ = Partial pressure of $O_2$ in atmospheres.

The rate constant $k = \dfrac{\text{g moles } SO_2 \text{ converted}}{\text{atmos} \times \text{second} \times \text{gram catalyst}}$ The rate constant $k_v$ reported herein = k X bulk density of sulfated catalyst in grams per cubic centimeter.

The durability of the catalyst (Accelerated Abrasion Loss) is measured by heating 150 grams of the fresh catalyst pellets at 816° C. for 24 hours. The catalyst pellets are then contacted with a gas mixture containing about 4.0% $SO_2$ and about 5.0% $SO_3$ for 2 hours at 432° C. A 100 gram sample of the heated and reacted catalyst is shaken over a standard 20 mesh sieve, U.S. Sieve Series, for 1 hour using a Rotap shaker. The loss in weight after shaking for 1 hour indicates the durability of the catalyst. The durability of the catalyst is indicated as the percent loss through the 20 mesh screen. The lower numbers indicate a more durable catalyst. The Accelerated Abrasion Loss test has been found to correlate closely with durability experienced with sulfur dioxide oxidation catalysts under commercial process operating conditions.

The invention will be more fully illustrated by reference to the following examples.

EXAMPLE

A stream of sulfur dioxide gas was passed into a slurry of 80 parts vanadium oxide ($V_2O_5$) and 220 parts potassium sulfate in 426 parts of concentrated sulfuric acid and 260 parts of water at 120° C. for a period of 2 hours. The solids dissolved and a clear blue solution was obtained. The hot (120° C.) solution was added slowly, with stirring, to 609 parts of diatomaceous earth. After completion of the addition, an additional 70 parts of water were added and mixed in order to produce a wet mixture suitable for making pellets. The mixture was then extruded into pellets 7/32 inches in diameter by ¼ to ½ inches in length.

The pellets were dried at 120° C. for 8 hours and then calcined at 370° C. for 4 hours. The product was a finished sulfated catalyst ready for direct use in the converter without the need for further sulfation. It had a uniform distribution of vanadium ingredients throughout as shown by its physical appearance.

Accelerated Abrasion Loss and the Activity were determined according to the method disclosed above; the results, together with other properties of the catalyst, were as follows:

| | |
|---|---|
| Accelerated Abrasion Loss (Percent) | 2[1] |
| Activity, $k_v \times 10^{-7}$, 432° C. | 114 |
| Density, gms./cc. | 0.580[1] |
|  | 0.588[2] |
| Crushing Strength, Kg.[3] | 8–11[1] |

[1] Determined before testing to determine activity.
[2] Determined after testing to determine activity.
[3] Crushing strength was determined employing a Stokes Hardness Tester.

The fact that there was essentially no increase in density after exposure to sulfating gases during testing for activity confirmed that the catalyst was in its finished, sulfated form prior to testing.

COMPARATIVE EXAMPLE

For purposes of comparison, a catalyst was prepared according to a conventional commercial process. Thus, eighty parts of vanadium oxide were mixed with 220 parts potassium sulfate and 609 parts of the same diatomaceous earth employed in the Example, and stirred until a uniform mixture was obtained. Water was added gradually until the mixture had a consistency suitable for forming pellets. The mixture was extruded into pellets 7/32 inches in diameter by ¼ to ½ inches in length. The wet pellets were dried at 120° C. overnight, calcined at 370° C. for 4 hours, and then tested for various properties. The Accelerated Abrasion Loss and the Activity were determined according to the method previously described. The results are tabulated below.

| | Before Testing for Activity | After Testing for Activity |
|---|---|---|
| Accelerated Abrasion Loss (Percent) | 8 | 2 |
| Activity, $k_v \times 10^{-7}$, 432° C. | — | 117 |
| Density, gms./cc. | 0.500 | 0.596 |
| Crushing Strength, kg.[1] | 2–4 | 8–13 |

[1] Crushing strength was determined using a Stokes Hardness Tester.

The above data indicate that increases in density and crushing strength are expected when a catalyst undergoes sulfation.

The fact that the density of the catalyst of this invention, as reported in the Example, did not significantly increase after testing for activity, which involved exposure to sulfur dioxide, indicated that it had already been sulfated. Furthermore, the crushing strength of the catalyst of this invention compared with the crushing strength of the commercial catalyst after testing, as reported in the Comparative Example, confirms that sulfation had already occured.

What is claimed is:

1. A method of making a catalyst for the oxidation of sulfur dioxide to sulfur trioxide which comprises:
    passing sulfur dioxide gas into an aqueous mixture of vanadium oxide, sulfuric acid and a potassium salt selected from the group consisting of potassium sulfate, potassium sulfite, potassium oxalate and potassium formate in situ at a temperature between about 25° C. and about 120° C. to provide a clear blue solution;
    impregnating diatomaceous earth with said solution;
    shaping the impregnated diatomaceous earth into pellets;
    drying the impregnated diatomaceous earth pellets; and
    calcining the dried diatomaceous earth pellets, thereby providing an active catalyst.

2. The method of claim 1 wherein a temperature between about 100° and about 120° C. is employed.

3. The method of claim 1 wherein said potassium salt is potassium sulfate.

4. A method of making a catalyst for the oxidation of sulfur dioxide to sulfur trioxide which comprises:
passing sulfur dioxide gas into an aqueous mixture of vanadium oxide, sulfuric acid and a potassium salt selected from the group consisting of potassium sulfate, potassium sulfite, potassium oxalate and potassium formate in situ at a temperature between about 25° C. and about 120° C. to provide a clear blue solution;
impregnating pelletized diatomaceous earth with said solution;
drying the impregnated diatomaceous earth pellets; and calcining the dried diatomaceous earth pellets, thereby providing an active catalyst.

5. The method of claim 4 wherein a temperature between about 100° C. and about 120° C. is employed.

6. The method of claim 4 wherein said potassium salt is potassium sulfate.

* * * * *